United States Patent
Moeller

(10) Patent No.: US 9,751,527 B2
(45) Date of Patent: Sep. 5, 2017

(54) IN-THE-ROAD, PASSABLE OBSTRUCTION AVOIDANCE ARRANGEMENT

(71) Applicant: Alcatel-Lucent USA Inc., Murray Hill, NJ (US)

(72) Inventor: Lothar Moeller, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 132 days.

(21) Appl. No.: 14/327,130

(22) Filed: Jul. 9, 2014

(65) Prior Publication Data

US 2016/0009276 A1    Jan. 14, 2016

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |

(Continued)

(52) U.S. Cl.
CPC ............ *B60W 30/09* (2013.01); *B60W 10/20* (2013.01); *B60W 50/14* (2013.01); *G01C 21/3667* (2013.01); *G01C 21/3691* (2013.01); *G01C 21/3697* (2013.01); *G06F 17/30117* (2013.01); *B60W 2050/143* (2013.01); *B60W 2550/147* (2013.01); *B60W 2710/20* (2013.01)

(58) Field of Classification Search
CPC ......... B60W 2550/147; G01C 21/3691; G01C 21/3697
USPC .......................................................... 701/93
See application file for complete search history.

(56) References Cited

U.S. PATENT DOCUMENTS

| | | | | |
|---|---|---|---|---|
| 5,159,837 A | * | 11/1992 | Wada | ..................... G01S 15/931 340/901 |
| 9,031,779 B2 | * | 5/2015 | Djugash | ............. G01C 21/3415 701/425 |

(Continued)

OTHER PUBLICATIONS

"'Street Bump' App Detects Potholes, Alerts Boston City Officials", Associated Press, Published Jul. 20, 2012, http://www.foxnews.com/tech/2012/07/20/treet-bump-app-detects-potholes-alerts-boston-city-officials/?test=latestnews, 2 pages.

*Primary Examiner* — Harry Oh
(74) *Attorney, Agent, or Firm* — Harness, Dickey & Pierce, P.L.C.

(57) ABSTRACT

A driver warning system automatically detects the existence of in-the-road, passable obstructions and provides timely notification to a driver in proximity of such an in-the-road, passable obstruction prior to it being encountered with sufficient warning time for the driver to avoid the in-the-road, passable obstruction. To detect in-the-road, passable obstructions, the warning unit of a driver whose vehicle hits an in-the-road, passable obstruction will automatically generate a signal that is indicative of the existence of the in-the-road, passable obstruction and its location. This signal may be transmitted to a server, which contains a database of located obstructions. The collected information about the detected in-the-road, passable obstructions are provided to various warning units, so that they, knowing the driver location, e.g., based on global positioning system (GPS), can provide the driver with a warning of any upcoming in-the-road, passable obstructions with sufficient lead time for the driver to avoid hitting the obstruction.

18 Claims, 5 Drawing Sheets

(51) Int. Cl.
  *G05D 1/00*   (2006.01)
  *G06F 7/00*   (2006.01)
  *G06F 17/00*  (2006.01)
  *G06F 19/00*  (2011.01)
  *B60W 30/09*  (2012.01)
  *G01C 21/36*  (2006.01)
  *B60W 10/20*  (2006.01)
  *B60W 50/14*  (2012.01)
  *G06F 17/30*  (2006.01)

(56) References Cited

U.S. PATENT DOCUMENTS

| | | | |
|---|---|---|---|
| 9,154,893 B1* | 10/2015 | Breed | G01C 21/3691 |
| 2007/0063875 A1* | 3/2007 | Hoffberg | G08G 1/0104 |
| | | | 340/995.1 |
| 2007/0291590 A1* | 12/2007 | Harada | G01S 7/527 |
| | | | 367/99 |
| 2010/0228482 A1* | 9/2010 | Yonak | G01S 3/8083 |
| | | | 701/301 |
| 2011/0213513 A1* | 9/2011 | Naderhirn | G05D 1/0202 |
| | | | 701/3 |
| 2012/0167689 A1* | 7/2012 | Urase | G01S 7/521 |
| | | | 73/627 |
| 2012/0203428 A1* | 8/2012 | Choi | B60G 17/016 |
| | | | 701/37 |
| 2012/0235852 A1* | 9/2012 | Hattori | G01S 15/10 |
| | | | 342/70 |
| 2013/0190964 A1* | 7/2013 | Uehara | G01C 21/3691 |
| | | | 701/25 |
| 2014/0062756 A1* | 3/2014 | Lamkin | G08G 5/0021 |
| | | | 342/29 |
| 2014/0168469 A1* | 6/2014 | Nitaki | H04N 1/2125 |
| | | | 348/231.2 |
| 2014/0200799 A1* | 7/2014 | Sugano | B62D 15/027 |
| | | | 701/301 |
| 2014/0277902 A1* | 9/2014 | Koch | G07C 5/008 |
| | | | 701/29.1 |
| 2015/0051753 A1* | 2/2015 | Kawamata | G01S 7/54 |
| | | | 701/1 |
| 2016/0003943 A1* | 1/2016 | Nakano | G08G 1/166 |
| | | | 701/301 |
| 2016/0069990 A1* | 3/2016 | Harada | G01S 15/931 |
| | | | 367/98 |

* cited by examiner

IN-THE-ROAD, PASSABLE OBSTRUCTION AVOIDANCE ARRANGEMENT

TECHNICAL FIELD

This invention relates to avoiding road obstructions when driving on the road.

BACKGROUND OF THE INVENTION

It is well known that there are various types of essentially stationary obstructions that appear on a road in the path of travel and would preferably be avoided by a driver traveling that road. Such stationary obstructions include potholes, gratings, fallen rocks, man-hole coverings, whether above or below grade, and the like. Because such an in-the-road, passable obstruction is on, or part of, the road itself, it is often difficult for a driver to see the in-the-road, passable obstruction in a timely manner, i.e., while still having enough time in order to avoid hitting it. Consequently, many times the driver cannot avoid the obstruction, and there is a resulting collision of the vehicle with the in-the-road, passable obstruction which may damage the vehicle. Note that such damage may not be immediately noticeable.

One possible solution to the road hazard problem is to eliminate or remove the obstruction. Many cities have encouraged those encountering an in-the-road, passable obstacle to report it to the city, so that the in-the-road, passable obstacle could be cleared. However, the reporting methods were not efficient. An improvement to such a reporting arrangement, a smartphone app "Street Bump" has been developed which automatically reports the locations of potholes to the city of Boston. As described in http://www.foxnews.com/tech/2012/07/20/treet-bump-app-detects-potholes-alerts-boston-city-officials/?test=latestnews, before starting a trip, a driver starts the Street Bump app and sets his smartphone either on the dashboard or in a cup holder. The app, uses the phone's accelerometer to sense when a bump is hit. The location of the bump, as determined using global positioning signals (GPS), is transmitted to a remote server hosted by Amazon Inc.'s Web services division. The system filters out things like manhole covers and speed bumps using a series of algorithms, including one that can tell if the initial motion is up over a speed bump, as opposed to down into a pothole. If at least three people hit a bump in the same spot, that spot is recognized as the location of a pothole.

Another possible solution is to direct the driver to reroute the vehicle via a different road than the one containing the obstruction. However, since such in-the-road obstructions are passable, guidance devices that are based on GPS and the like do not direct the driver to reroute the vehicle simply based on the existence of such in-the-road passable obstructions. Herein such obstructions may be referred to as passable road obstructions, on the path of travel, in-the-road obstructions that are passable, non-rerouting road obstructions, or the like.

SUMMARY OF THE INVENTION

While reporting an in-the-road, passable in-the-road, passable obstacle in real time to the city responsible for clearing such obstructions is an improvement over prior methods, still there is considerable delay between the time that an in-the-road passable in-the-road, passable obstacle is reported and the time that it is cleared. This is especially true in large metropolitan areas that suffer from severe weather, and so often have many such in-the-road, passable obstacles develop during the winter months. As such, I have also recognized that it would be desirable to have a warning given to a driver with sufficient time to avoid the various in-the-road, passable obstructions. Therefore, in accordance with the principles of the invention, I have developed an in-the-road, passable obstruction warning unit that not only automatically detects and reports the existence of such obstructions but one that automatically provides notification to a driver of a vehicle when coming into proximity of an in-the-road, passable obstruction prior to it being encountered. Preferably the notification is given in a timely manner so that there is sufficient warning time for the driver to take appropriate action, e.g., to avoid the obstruction. Note that the driver of the vehicle need not solely be a person, e.g., it can be an automatic control system such as an autopilot or it may be a human driver using a cruise control or other driving aid.

More specifically, the in-the-road, passable obstruction warning unit of a driver whose vehicle hits an in-the-road, passable obstruction will automatically generate a signal that is indicative of the existence of the in-the-road, passable obstruction and its location. This signal may be transmitted to a server with access to a database of located obstructions. Determination of whether a particular impact represents an in-the-road, passable obstruction that should be avoided in the future may be done either in the device in the vehicle or in the server. The server may collate information from various users, so that a data base of in-the-road, passable obstruction locations in a particular area is built. The collected information about the detected obstructions is provided to various in-the-road, passable obstruction warning units, so that they, knowing the driver location, e.g., based on global positioning system (GPS), can provide the driver with a warning of any upcoming obstructions with sufficient lead time for the driver to avoid hitting the obstruction.

The in-the-road, passable obstruction warning unit may be, for example, an independent device, part of or make use of a) a smartphone or similar device such as an electronic tablet, a smartwatch, smart glasses, b) a navigation system, or c) some other collection of units within the vehicle.

The in-the-road, passable obstruction warning unit may sense signals generated by the encounter with the obstruction. For example, the in-the-road, passable obstruction warning unit may use a) one or more accelerometers to detect various accelerations, some of which may be indicative of impacts with an obstruction, b) one or more microphones which detect sounds, some of which may be indicative of an impact with an obstruction, or c) other sensing capabilities. Preferably, the warning given to the driver may be in any form detectable by a human, e.g., audio, video, tactile, or olfactory. The warning may be lane specific, e.g., only given to drivers in a particular lane or lanes of a multilane highway, and it may contain information as to which direction or lane is best to take to avoid the obstruction.

In one embodiment of the invention, some or all of the sensing devices may be a built-in part of the vehicle. For example, accelerometers used to detect the in-the-road, passable obstruction may be built into the vehicle, e.g., they may be part of the airbag system. Alternatively, microphones used for voice communication or used for noise reduction purposes which are built into the vehicle may be employed. The detected signals, e.g., accelerations or sounds, could then be processed. Such processing may be performed by a processor built-in to the vehicle that also performs other functions in the vehicle aside from in-the-road, passable obstruction detection and avoidance. A report developed in response to the detected signals may be sent to the server by using a navigation and/or communication system that is likewise built into the vehicle and which may also be used for other communication purposes as well. Alternatively, information about the detected signals could be transmitted over a communications link to a non-built-in navigation system or smartphone. While such a communications link may be of any type, the ubiquitousness of support for Bluetooth in smartphones, portable devices, and even vehicles suggest that using a Bluetooth communications link may be particularly advantageous in terms of cost and development.

Information about the detection system and the vehicle may be useful for determining the type and nature of the obstruction. For example, a smaller vehicle with a particular type of suspension encountering an in-the-road, passable obstruction will provide a different level of signal than a larger vehicle with the same type of suspension encountering the same in-the-road, passable obstruction at the same speed. Thus, the detection, in part, may be dependent on characteristics of the detecting system, which may include characteristics of the vehicle in which the detecting system is located as well as the location within the vehicle of the detecting system, and the speed of the encounter between the detecting system and the in-the-road, passable obstruction.

In accordance with an aspect of the invention, instead of or in addition to a perceivable warning for a human driver, in response to an upcoming in-the-road, passable obstruction the suspension of the vehicle may be modified, e.g., softened, to provide for less of an annoyance to human occupants of the vehicle in the event the in-the-road, passable obstruction is hit as may happen even if a timely warning is issued as there may not be any way to avoid the obstruction. If the vehicle is being driven on cruise control, the vehicle may be automatically slowed to reduce the effect of an impact or to give the driver more time to avoid the in-the-road, passable obstruction. If the vehicle is being driven by a form of automatic pilot, the information may be given to the automatic pilot to avoid the in-the-road, passable obstruction.

In one embodiment of the invention, an advertisement may be played to the user in association with the warning, e.g., before, after, or as part of the warning. For example, after saying "Pothole to the left in 500 feet, stay right", the device could say "This pothole avoidance warning was brought to you by Alcatel-Lucent." Alternatively, a visual advertisement could be displayed to the user. The advertisement may be selected as a function of various parameters such as vehicle location, destination of the vehicle and the route thereto, a profile of the user believed to be driving the vehicle, information on the driving habits of the user, or the like.

In the event the in-the-road, passable obstruction is eliminated, e.g., a pothole is repaired or a road hazard is removed from the road, the in-the-road, passable obstruction is removed from the system, e.g., effectively deleted from the database. While elimination of the in-the-road, passable obstruction may be indicated manually by a driver sending an indication via his device that the in-the-road, passable obstruction was not seen or by the remover/repairer informing the database, in accordance with an aspect of the invention, elimination of the in-the-road, passable obstruction may be indicated automatically by determining that the in-the-road, passable obstruction is no longer being detected, which may require turning off the warning for the in-the-road, passable obstruction for a percentage of the vehicles.

DETAILED DESCRIPTION

Figure 1:
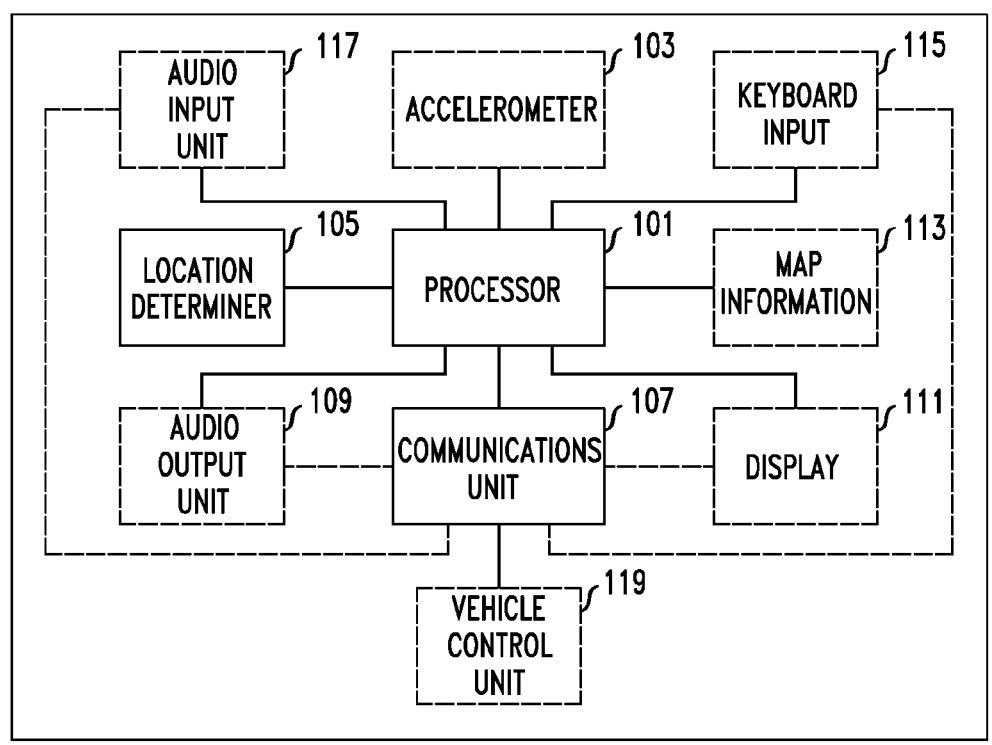
FIG. 1 shows an exemplary in-the-road, passable obstruction warning unit for a driver for use as part of a warning system that automatically detects the existence of road obstructions and provides timely notification to a driver in the proximity of an in-the-road, passable obstruction prior to it being encountered.

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

In the description, identically numbered components within different ones of the FIGS. refer to the same components.

In accordance with the principles of the invention, an in-the-road, passable obstruction warning unit automatically detects the existence of in-the-road, passable Obstructions and provides a notification to a driver of a vehicle when coming into proximity of an in-the-road, passable obstruction prior to it being encountered. Preferably the notification is given in a timely manner so that there is sufficient warning time for the driver to take appropriate action, e.g., to avoid the in-the-road, passable obstruction. Note that the driver of the vehicle need not solely be a person, e.g., it can be an automatic control system such as an autopilot or it may be a human driver using a cruise control or other driving aid.

FIG. 1 shows exemplary in-the-road, passable obstruction warning unit 100 for a driver for use as part of a warning system that automatically detects the existence of in-the-road, passable obstructions such as potholes and may provide notification to a driver in the proximity of an in-the-road, passable obstruction prior to it being encountered, preferably in a timely manner, e.g., with sufficient warning time for the driver to avoid the in-the-road, passable obstruction or take other appropriate action. More specifically, the in-the-road, passable obstruction warning unit 100 is generally intended to be with a driver for the collection of in-the-road, passable obstruction information and to provide the driver with an appropriate warning of upcoming in-the-road, passable obstructions. Shown in FIG. 1 are a) processor 101, b) optional accelerometer 103, c) location determiner 105, d) communications unit 107, e) optional audio unit 109, optional display unit 111, g) optional map information 113, h) optional keyboard 115, i) optional audio input unit 117, and j) optional vehicle control unit 119.

Processor 101 is capable of providing the computation and storage resources necessary to provide the functions described herein in conjunction and communication with the other various units. Processor 101 is coupled to receive information from and transmit information to various ones of accelerometer 103, location determiner 105, communications unit 107, audio unit 109, display unit 111, map information 113, and keyboard 115.

Accelerometer 103 is a conventional accelerometer, and may be, for example of the type typically found in smart phones. Alternatively, for example, accelerometer 103 may be part of a vehicle air bag sensor system and is coupled through the vehicle to processor 101 using a wired or wireless connection. In the event of a wireless connection, such a connection may actually pass via communications unit 107. Typically, accelerometer 103 is a three-dimensional accelerometer, in that it is capable of i) detecting vibrations individually in all three directions, and ii) providing as outputs information on the level of the detected vibration in each direction. As such, accelerometer 103 may actually be composed of three orthogonal component accelerometers. An indication of the overall magnitude of the vibration may be determined by adding the square of the level of each of the output directions, as the output in each direction is typically a vector.

Location determiner 105 is used to determine the location of in-the-road, passable obstruction warning unit 100. For example, location determiner 105 may be a type of global positioning system (GPS) receiver. Such a receiver receives signals from various satellites and triangulates the signals received therefrom in order to determine a location. In addition or instead of the United States deployed GPS system, signals from other satellites such as those of Global Navigation Satellite System (GLOSNASS) or Beidou may be employed. Location determiner may 105 may just be the signal receivers and work in conjunction with processor 101 to process the received signals and determine the location coordinates, or it may determine the coordinates itself and simply provide the results to processor 101. Typically location determiner 105 supplies a set of coordinates, e.g., latitude and longitude. Instead of a GPS-based system, location determiner 105 may use other forms of signal triangulation, such as employing signals from cellular base stations. Of course, location determiner 105 may use more than one form of triangulation, e.g., to enhance accuracy, such as is done in enhanced GPS systems. Location determiner 105 may also make use of dead reckoning, e.g., by determining vehicle speed and direction. Speed may be obtained from the vehicle speedometer via vehicle control unit 119 and changes in direction may be interpreted using accelerometer measurements coupled with map information from map information 113.

Communications unit 107 is used to facilitate communications with elements of in-the-road, passable obstruction warning unit 100 that are not integral, e.g., not within the same housing, with processor 101 and may also communicate with other devices, such as servers, that are external to in-the-road, passable obstruction warning unit 100, e.g., via some form of wireless communication. For example, communications unit 107 may include one or more of a) a universal serial bus (USB) port, b) a cellular radio interface, c) an Ethernet port, d) a Bluetooth port, e) a radio frequency, e.g., amplitude modulation (AM) or frequency modulation (FM) broadcast unit, f) a custom port, such as might be built in to an automobile to allow communication with various components built therein, g) High-Definition Multimedia Interface (HDMI), or h) the like.

Audio output unit 109 is a unit to provide an audible signal to a user. Such an audible signal may be i) a tone or other sound, ii) a voice announcement indicating the location of an in-the-road, passable obstruction that the vehicle is approaching, iii) an advertising announcement, iv) other information that the driver may be able to make use of or v) the like. The audio output unit may include various components, such as amplifiers and one or more electroacoustic transducers, such as speakers. Audio output unit may simply output audio signals supplied by processor 101, or it may participate in the conversion of particular output indicated by processor 101, e.g., by including, for example, a text-to-speech functionality. Also, instead of directly supplying sound as an output, audio output unit might provide signals representing the sound to communications unit 107, which can then supply such signals to a sound system of the vehicle or for transmission over a radio frequency, e.g., for reception by a properly tuned radio in the vehicle.

Display 111 is capable of showing in visual form various pieces of information, such as 1) current vehicle location, e.g., on a map, 2) textual information, 3) a representation of the location of an in-the-road, passable obstruction in the road, e.g., on a map, and 4) an indication of the type of in-the-road, passable obstruction in the road. They type of in-the-road, passable obstruction in the road could be, for example, a) a pothole, where the vehicle first goes down before it goes up, or b) an in-the-road, passable obstruction where the car would go up first before coining down, such as an exposed manhole cover or a short hump in the road. Additionally, advertising messages may be displayed on display 111. Display 111 may be part of the vehicle, in which case information for display on display 111 is sent from processor 101 to display 111 via communications unit 107.

Map information 113 contains road information and topographical information which may be used by processor 101 in determining if an in-the-road, passable obstruction is being approached by the vehicle, and what a driver might do to avoid such an obstruction, such as changing lanes.

Keyboard input unit 115 represents the ability to enter information into in-the-road, passable obstruction avoidance unit 100. Keyboard input 111 may be a real physical keyboard or a virtual keyboard, e.g., the interpretation of touches made on display 111. Furthermore, the "buttons" of the keyboard may be so-called "soft-buttons", i.e., defined regions having. associated with specified functions that are identified to the user by the button's graphic or label. For example, such buttons could be used to help quickly identify the type of vehicle, which would enable characteristics of such vehicle to be taken into account when determining the size or severity of an in-the-road, passable obstruction. Such keys could also be employed to enable a user to indicate the type of in-the-road, passable obstruction that was just encountered, so that a later warning could be appropriately tailored. Keyboard unit 115 may be part of the vehicle, e.g., if it is a virtual keyboard being displayed on display 111 which is built into the vehicle. If so, communication of information from keyboard input unit 115 to processor 101 takes place via communications unit 107.

Audio input unit 117 is capable of receiving audio signals from the environment and providing a representation thereof to processor 101. In the event that audio input unit 117 is built into the vehicle then the communication of information about the audio signals from audio input unit 117 to processor 101 takes place via communications unit 107. Audio signals received by audio input unit 117 may be used to discriminate the magnitude of an impact and possibly determine the type of object with which an impact occurs.

For example, when a vehicle encounters a pothole, a characteristic sound, which is similar to a loud bang, is generated. In contrast to engine noise, tire noise, wind noise, and other noises in traffic, the pothole generates a relatively short bang with high frequency components. For example, engine noise and tire noise are more continuous over time. Furthermore, frequency ranges not perceivable by the human ear can be detected by common microphones and used to discriminate pothole hit generated noise from other car sounds such as drumming in music played in the car.

To this end, a microphone receives the sound of a pothole bang and the output of the microphone is digitized for use in the digital domain. A digital signal processor (DSP) is employed to analyze the signal from the microphone. For example, the DSP squares the signal from the microphone and integrates this quantity over a short time interval. This interval is comparably short compared to the time it takes the car to drive through the pothole. In one embodiment of the invention, the integrated signal is high pass filtered, either before or after the squaring. The resulting signal is compared against a threshold, and if values over the length of time for a typical pothole encounter are found, it is determined that an in-the-road, passable obstruction was hit. Alternatively, the processed signal is compared with other signals that were recorded shortly before or after the pothole bang. If the pothole bang signature is much larger than the other signatures then it is determined that a pothole was encountered.

A pothole encounter can be distinguished from certain other sounds that are generated, e.g., a car door slam. For example, if the car is not moving, as can be determined from the fact that the GPS coordinates are not changing over time from before or after the sound is detected, the sound is likely not a pothole, e.g., it could be the slamming of a car door, the trunk, or the hood.

Additional information for determining whether or not a pothole was encountered may be obtained from the accelerometer measurements.

In the event it is determined that a pothole was encountered, the GPS coordinates together with the recorded pothole signature is sent to the server.

Audio signals may also be voice commands for the system from a user, the particular commands being determined using conventional voice recognition processing. Additionally, information about the model of the vehicle or its loading may be determined from the audio signals obtained by audio input unit 117 as the vehicle is driven to provide system calibration and reference levels.

Optional vehicle control unit 119 may control the vehicle so as to 1) aid in in-the-road, passable obstruction avoidance, 2) to provide for in-the-road, passable obstruction avoidance automatically, or 3) otherwise minimize the effect on the vehicle and/or driver. For example, the suspension of the vehicle, typically with active suspension, may be modified, e.g., softened, to provide for a better ride in the event the in-the-road, passable obstacle is encountered. If the vehicle is being driven on cruise control, the vehicle may be automatically slowed to reduce the effect of an impact or to give the driver more time to avoid the in-the-road, passable obstruction. If the vehicle is being driven by a form of automatic pilot, the information may be given to the automatic pilot to avoid the in-the-road, passable obstruction. Although it is possible for vehicle control unit 119 to be more directly connected to processor 101, since it is envisioned that vehicle control unit 119 is part of the vehicle, communications with between vehicle control unit 119 and processor 101 are more likely to take place via communications unit 107.

Vehicle control unit 119 may also feed back information on the make and model of the vehicle, as well as options and specialized settings thereon, so that a better judgment of the type of in-the-road, passable obstruction encountered given a particular signal may be made.

Figure 2:
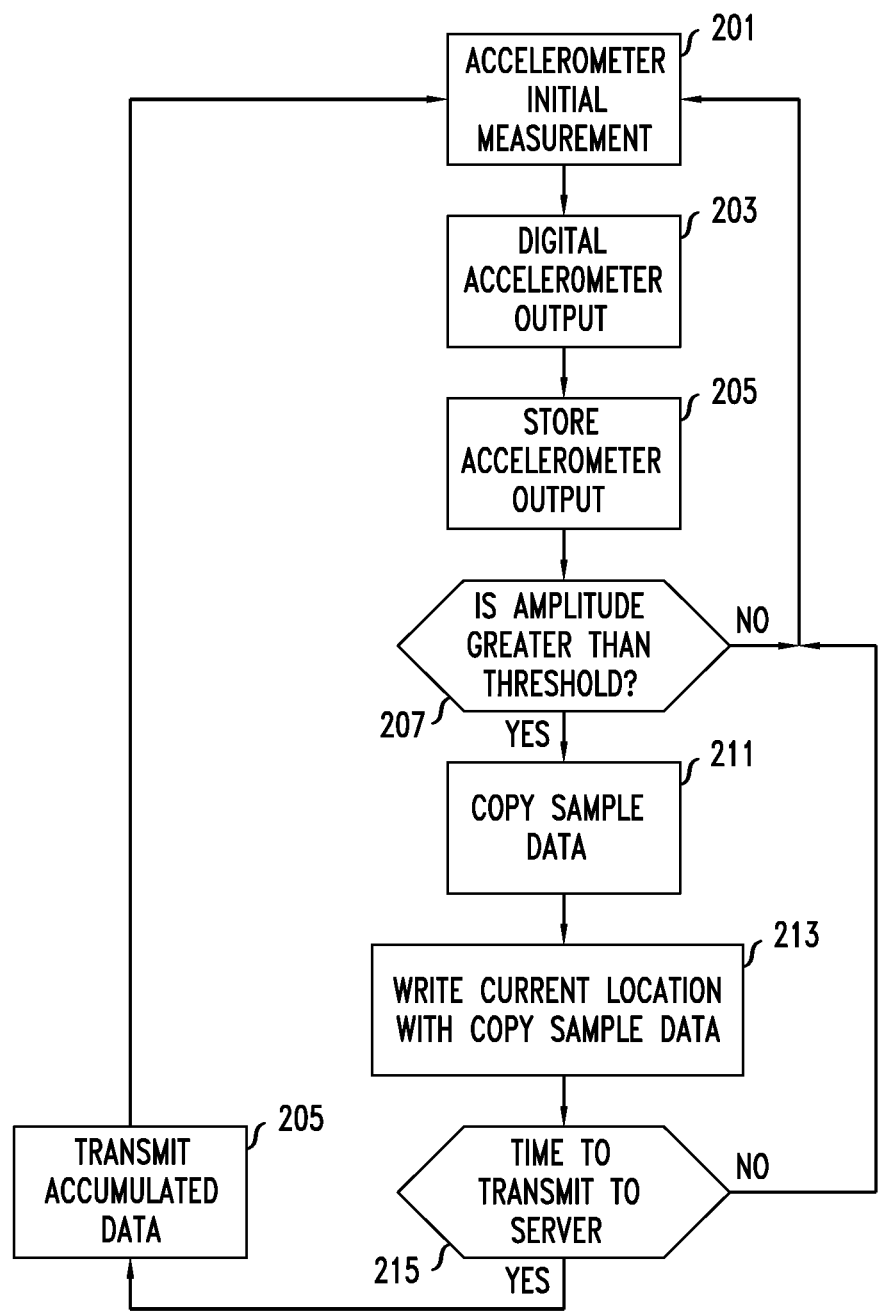
FIG. 2 shows a flow chart of an exemplary process for detecting and reporting indications of the existence of a road obstruction.

In-the-road, passable obstruction avoidance unit 100 may be implemented in a navigation system or a smartphone, which may or may not be imbedded in or built-in to a vehicle and which, if not embedded or built-in, may, or may not, operate cooperatively with elements which are embedded or built-in to the vehicle. One such exemplary suitable smartphone is the Nexus 1 running the Android operating system developed by the Open Handset Alliance led by Google FIG. 2 shows a flow chart of an exemplary process for detecting and reporting indications of the existence of an in-the-road, passable obstruction such as a) a pothole, b) a precipitously uneven road surface, c) an item on the road that may be driven over, such as a board or tire remains, a pile of rocks, and tree limbs, d) other obstructions mentioned herein or e) the like. The process may be performed by a user device such as a various instantiations of in-the-road, passable obstruction warning unit 100 (FIG. 1). The process of FIG. 2 is may be a repeating loop type process that begins when a user activates an application on the user device that is intended to detect and report the location of likely in-the-road, passable obstructions. Note that such activation may be automatic upon powering up and initializing in-the-road, passable obstruction avoidance unit 100 (FIG. 1).

In step 201 (FIG. 2) an initial measurement of shocks experienced is made. Note that although the measurement of shocks experienced is described hereinbelow in terms of acceleration shocks as measured e.g., by accelerometer 103 (FIG. 1), such measurement of shocks experienced may be also be performed using audio signals, e.g., via audio input unit 117, and the acceleration shocks may also be combined with audio measurements. Preferably, the accelerometer can measure acceleration in 3 dimensions, e.g., x, y, and, z axes, but an accelerometer which can measure acceleration even in only a single dimension may be employed, although as will be readily understood by those of ordinary skill in the art, there is likely to be limits on the location and orientation of such an accelerometer. Given that accelerometer 103 may actually be composed of three orthogonal component accelerometers, an indication of the overall magnitude of the vibration caused by hitting an in-the-road, passable obstruction may be determined by adding the square of the level of each of the output directions.

Furthermore, the measurements of multiple accelerometers may be combined. Such measurements are typically repetitively performed, e.g., at substantially regular intervals.

In step 203 (FIG. 2) the outputs from the accelerometers are converted to digital form, e.g., by analog to digital conversion, typically at a prescribed sampling rate. The sampling rate should be sufficiently fast to allow for the detection of in-the-road, passable obstructions but need not be unduly fast to create unnecessary data samples. In determining a practical sampling rate, as will be well understood by those of ordinary skill in the art, one should take into account the speed of the processor and the additional power consumed in taking such measurements. Although there is no particular lower bound if enough vehicles participate, and higher sampling rate of about 100 measurements per second would yield high quality results quickly, a sampling rate of approximately between 30 measurements per second has been found to provide good results with the aforementioned Nexus 1.

Note that one or more of the accelerometers employed may be designed to supply its output in a digital form. The digital version of the accelerometer data is then stored, e.g., in a first area of memory, in step 205. The accelerometer sample data may be written into the first memory area in a circular manner, so that once the memory is filled up the oldest written locations are overwritten with new sample data.

Conditional branch point 207 tests to determine if the detected signal is likely to indicate an in-the-road, passable obstruction that should be avoided in the future. For example, the test result will be YES if the amplitude of the current sample of the accelerometer data is greater than a prescribed threshold, which may be relative to the average noise detected by the accelerometer. The threshold may be determined in part, e.g., scaled from a baseline threshold, based on characteristics of the vehicle, e.g., weight, size, tire size, suspension tightness and the like, which are determined, e.g., by using signals received by audio input unit 117, from user supplied input using keyboard 115, or from vehicle control unit 119, or some other input source. Alternatively, the threshold can be held constant and the signal measurement scaled appropriately. Indeed, it may be best to scale the accelerometer samples, because that makes accelerometer samples from different vehicles more easily comparable and combinable without needing to also provide information about the vehicle in which the sample was taken together with the sample.

To this end, before taking measurements, an initial value may be set for the average noise. Thereafter, the average noise is updated by adding each new sample and dividing by the number of samples. Alternatively, the average may be simply developed over time. The average noise pattern is used as a baseline scaling purposes. The average noise, which represents a sensitivity of the system, may be sent to the server for use in further data analysis.

In order to take into account the fact that a sample may not be collected at the immediate instance of impact, due to the periodic nature of the sampling, which may not coincide with the actual time of impact, it is desirable to process the current sample in conjunction with previous samples to determine from the pattern, e.g., detected ringing, that a sample is indicative of hitting an in-the-road, passable obstruction. In the event that it is determined for a sample that the pattern indicates the detected signal is likely to indicate an in-the-road, passable obstruction that should be avoided in the future, the test result for step 207 will be YES. In such a case, the difference in time between the actual impact and the detection of the impact is negligible.

If the test result in step 207 is NO, indicating that the amplitude of the current sample of the accelerometer data is not greater than the prescribed threshold, and so it is likely that the current sample does not represent an in-the-road, passable obstruction, control passes to back to step 201 to obtain a new sample and the process repeats itself as described above. If the test result in step 207 is YES, indicating that the amplitude of the current sample of the accelerometer data is indeed greater than the prescribed threshold, and so it is likely that the current sample represents an in-the-road, passable obstruction, control passes to step 211.

In step 211 a window of previously stored data samples starting from the location in the first memory area and working backward is copied into a second memory area. It also marks to copy subsequent accelerometer measurements for an additional window of time in the future to the second memory area. These two windows represent an accelerometer signature for the detected event represented by exceeding the threshold. Alternatively, instead of looking at a single sample and comparing against the threshold, the values from a series of samples may be combined and the combined value compared against a threshold.

Thereafter, in step 213, the current location of the vehicle, e.g., as determined using location determiner 105 (FIG. 1), e.g., global positioning system (GPS) coordinates, which is made available to the user device, is written into the second memory area in association with the current accelerometer sample. With the aforementioned Nexus 1 it has been found that taking GPS readings at a rate of 1 per second has been found to provide good results. In addition, the current time, which may be obtained from any source, such as a) location determiner 105, e.g., as time information is derivable from the GPS information, b) an on-board clock, which may be interfaced via communications unit 107, c) a clock internal to in-the-road, passable obstruction warning unit 100 for which the time is set using keyboard input 115, or d) the like. In one embodiment of the invention, the velocity at which the user device is traveling, e.g., the velocity of the vehicle, is also written into the second memory area in association with the current accelerometer sample. The velocity may be obtained by using the position information obtained to determine the distance traveled between two readings of the accelerometer and dividing by the time between those readings. The sample data and location information may be written into the second memory area in a circular manner, so that once the memory is filled up the oldest written locations are overwritten with new information.

Alternatively, a window of samples, typically extending no more than up to and not past the last sample that exceeded the threshold prior to the current sample, and including therefore their GPS and time information, may be written into the second memory area in association with the current accelerometer sample. From such sample information the server will be able to determine the vehicle speed and may be better able to determine the nature of the in-the-road, passable obstruction.

Conditional branch point 215 (FIG. 2) tests to determine if it is time to transmit the data accumulated on potential in-the-road, passable obstructions to the server. If the test result in step 215 is NO, indicating that it is not yet time to transmit the data accumulated on potential in-the-road, passable obstructions to the server, control passes to back to step 201 to obtain a new sample and the process repeats itself as described above. If the test result in step 215 is YES, indicating that it is time to transmit the data accumulated on potential in-the-road, passable obstructions to the server, control passes to step 217 and the data in the second memory area that was accumulated since the last transmission is transmitted from the user device toward the server. This may be done for example, via wireless transmission directly from the user device or indirectly from the user device to some other transmission-capable device within the vehicle which then relays the information being transmitted wirelessly. For example, if the user device is in-the-road, passable obstruction avoidance unit 100 (FIG. 1), the transmitter may be made from processor 101 via communications unit 107. The information so broadcasted may travel over various networks before ultimately arriving at the intended server. Control then passes to back to step 201 (FIG. 2) to obtain a new sample and the process repeats itself as described above.

In an alternative arrangement, the time to transmit data to the server may only occur after the user device has been specifically triggered by an action to transmit the data. For example, the user may activate a control on the user device telling it to transmit the information or perhaps the user device is linked to another network-connected device, e.g., a personal computer, and the data is relayed via the network-connected device.

Figure 3:
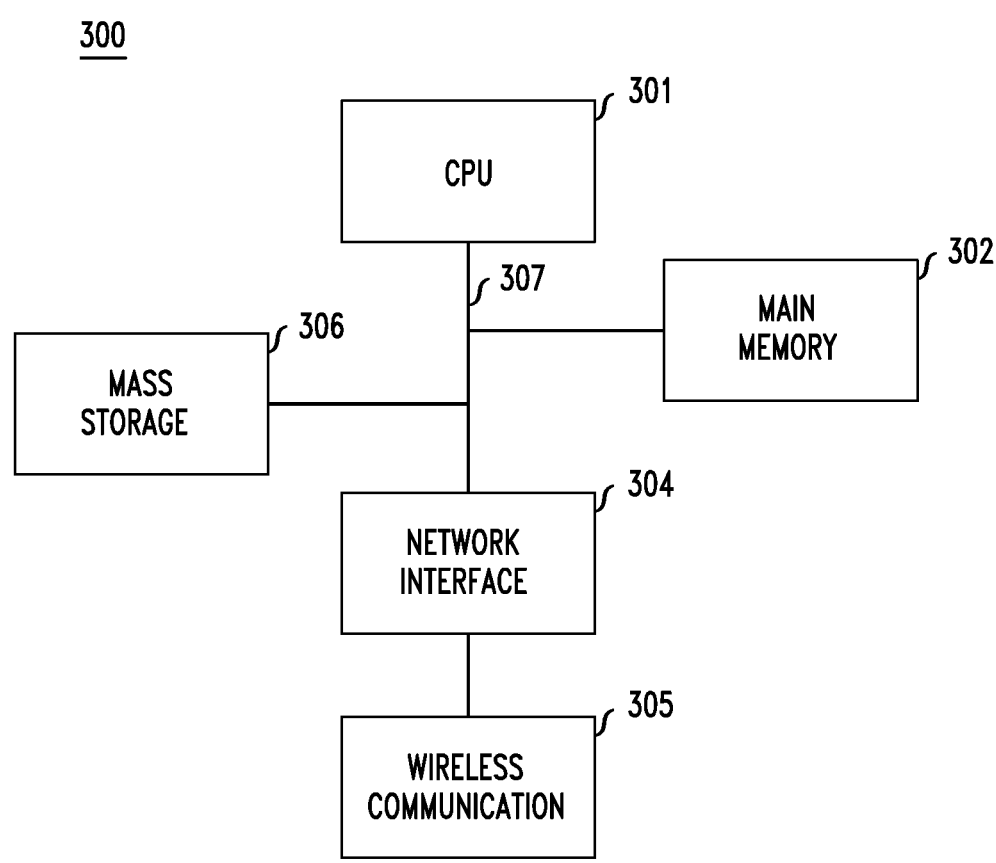
FIG. 3 shows an exemplary server on which the present invention may be implemented.

While a server of the invention may be implemented on nearly any conventional computer system, an exemplary server 300 on which the present invention may be implemented is shown in FIG. 3. Server 300 includes a) central processing unit (CPU) 301; b) main memory 302; c) network interface 304; d) wireless communication 305 for transmitting and receiving information regarding in-the-road, passable obstructions and possibly advertisements, in accordance with the present invention; and e) mass storage 306, which may include both fixed and removable media using any one or more of 1) magnetic, optical, or magnetoptical storage technology, 2) solid state drives, or 3) any other available mass storage technology. Except for wireless communication 305, these components are interconnected, e.g., via conventional bi-directional system bus 307. For example, bus 307 may contain 32 address lines for addressing any portion of memory 302 and mass storage 306. System bus 307 also includes a 32 bit data bus for transferring data between and among a) CPU 301, b) main memory 302, c) network interface 304, and d) mass storage 306.

In the embodiment shown, CPU 301 may be considered to be an Intel CORE i7 microprocessor, but any other suitable microprocessor or microcomputer may alternatively be used. Detailed information about the CORE i5 microprocessor, in particular concerning its instruction set, bus structure, and control lines, is available from Intel. All of the components of server 300 may be implemented in a more integrated fashion, up to and including all being on a single integrated circuit.

Server 300 contains a database of located in-the-road, passable obstructions, e.g., stored in mass storage 306. Server 300 may collate information from various users, so that the data base of in-the-road, passable obstruction locations in a particular area is built. The collected information about the detected in-the-road, passable obstructions is then provided to the device, which, knowing the driver location, e.g., based on global positioning system (GPS), can provide the driver with a warning of any upcoming in-the-road, passable obstructions with sufficient lead time for the driver to avoid hitting the in-the-road, passable obstruction.

Figure 4:
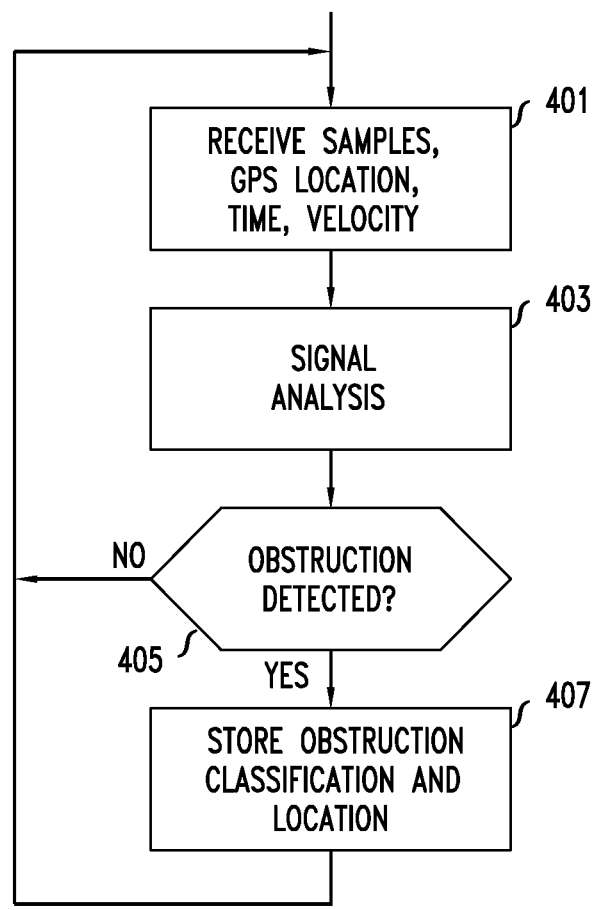
FIG. 4 shows an exemplary process for determining that an in-the-road, passable obstruction has been detected and storing pertinent details about the obstruction.

FIG. 4 shows an exemplary process for determining that an in-the-road, passable obstruction has been detected and storing pertinent details about the in-the-road, passable obstruction. The process of FIG. 4 may be performed by a server, such as server 300 (FIG. 3). The process of FIG. 4 begins in step 401 when the server receives a) accelerometer samples, b) GPS location information, c) time information, and, d) optionally, velocity information from in-the-road, passable obstruction warning unit 100 (FIG. 1) which collects and transmits such information in a manner such as is shown in FIG. 2. For example, a server, such as server 300 (FIG. 3), may receive such information via wireless communication 305 and network interface 304.

Next, in step 403, signal analysis is performed on the received information in conjunction with other previously received information regarding the same location to determine the nature of the in-the-road, passable obstruction, if any. For example, the average of the integral of the accelerometer readings over a time window T may be taken, e.g., calculating $\phi = 1/T \int_0^T (a_x^2 + a_y^2 + a_z^2) \, dt$.

In addition, various filter functions may be employed to remove or minimize the impact of extraneous signals. For example, a low pass filter may be employed to filter out accelerometer readings contributed by engine noise, while a high pass filter may be employed to filter out accelerometer readings contributed by normal acceleration of the vehicle. Additionally, normalization may be performed to take into account the type of vehicle or the characteristics of the vehicle which may have been transmitted from in-the-road, passable obstruction warning unit 100 (FIG. 1) to server 300 (FIG. 3) as part of the initialization of the communication between in-the-road, passable obstruction warning unit 100 (FIG. 1) and server 300 (FIG. 3). Similarly, analysis may be made to determine if the in-the-road, passable obstruction is 1) a pothole-type, e.g., by determining that there was a downward motion prior to an upward motion, or 2) a bump type, where there is an upward motion prior to a downward motion, such as may occur with a raised man-hole cover, branches, a localized hill, or rocks.

Statistical analysis may be performed to combine impacts in the same location to develop a more refined understanding of the in-the-road, passable obstruction than can be obtained from a single impact. For example, a pothole or a manhole near the edge of a street is likely to be hit by only a very low percentage of the cars passing that area of the road, maybe one percent. Given the low likelihood of actually impacting such an in-the-road, passable obstruction, it can be deemed unnecessary to warn drivers of such an obstruction. In fact, this is advantageous because too many warnings of in-the-road, passable obstructions that are not of real interest to the driver could annoy the driver, perhaps even to the point of deactivating the system. Therefore, if only a very small percentage of the cars passing in the vicinity of an in-the-road, passable obstruction impact it, then the in-the-road, passable obstruction will not be stored on the warning list, although it could in any event be stored for pointing out to authorities to fix it. The result of such statistical analysis may be that what appeared to be a reportable in-the-road, passable obstruction is not actually one, and so information about that alleged in-the-road, passable obstruction will not actually be stored.

Conditional branch point 405 tests to determine if an in-the-road, passable obstruction has been detected by the analysis in step 403. If the test result in step 405 is NO, indicating that the current information, even when combined with previously received information, does not suggest that an in-the-road, passable obstruction is present, control passes back to step 401, and the process continues as described above. If the test result in step 405 is YES, indicating that the current information either on its own or when combined with previously received information indeed suggests that an in-the-road, passable obstruction is present, control passes to step 407 in which information indicting the existence of the in-the-road, passable obstruction, which may include its type, e.g., as determined by analysis, as well as the location of the in-the-road, passable obstruction, e.g., its GPS coordinates, is stored. Control then passes back to step 401 and the process continues as described above.

There are several ways that the information accumulated in a server which indicates the existence of in-the-road, passable obstructions may be employed. Perhaps the simplest is for the entire list of in-the-road, passable obstructions, e.g., their type and locations, e.g., GPS coordinates, to be downloaded to a device used in the vehicle, such as vehicle avoidance unit 100 (FIG. 1). This may be done wirelessly, e.g., being sent by server 300 (FIG. 3) via wireless communication 305 and network interface 304 to in-the-road, passable obstruction avoidance unit 100 (FIG. 1) using communications unit 107, or using a wired connection, e.g., being sent by server 300 (FIG. 3) via network interface 304 to in-the-road, passable obstruction avoidance unit 100 (FIG. 1) using communications unit 107. In-the-road, passable obstruction avoidance unit 100 can then compare its current location with the locations of in-the-road, passable obstructions received to determine the distance from the vehicle to each in-the-road, passable obstruction, and if the distance is within a prescribed threshold, which may be set in response to a selection made by the user, and the relatively imminent expected route of travel is such that the in-the-road, passable obstruction will be encountered by the vehicle, a warning can be given to the driver of the impending in-the-road, passable obstruction. Such a warning may specify the nature of the in-the-road, passable obstruction, the estimated time or distance to the in-the-road, passable obstruction, and an avoidance strategy, such as moving to the right or the left, or advice to simply slow down. The length of time prior to encountering the in-the-road, passable obstruction at which the warning is given should take into account the speed at which the vehicle is traveling so as to provide the driver sufficient time to implement the suggested avoidance strategy.

Note that there are situations, such as an intersection, where they may be an in-the-road, passable obstruction within the radius of the prescribed threshold but yet will not be encountered by the vehicle based on its anticipated path of travel. As such, it is better that in-the-road, passable obstruction warning unit 100 further check the expected path of the vehicle so as to determine if the front of the vehicle is expected to actually pass over the location where the in-the-road, passable obstruction is and, if so, to issue the alarm. The same similarly applies to roads with multiple lanes, where the in-the-road, passable obstruction is wholly located in a lane of travel that the vehicle is not traveling in. Of course, in the event that the vehicle is determined to be traveling in the lane in which the in-the-road, passable obstruction is located, a warning should be given to the driver, preferably sufficiently in advance of encountering the in-the-road, passable obstruction to give the driver time to change lanes and avoid the in-the-road, passable obstruction. However, in the event that the vehicle is determined to be traveling in a lane in which the in-the-road, passable obstruction is not located, a warning may be given to the driver of the existence of the in-the-road, passable obstruction in the other lane, so that the driver does not change lanes and thereby encounter the in-the-road, passable obstruction.

Users could download the coordinates of the in-the-road, passable obstructions in advance of travel from the server, e.g., via a wired or wireless connection over the internet, to network interface 304.

In other embodiments of the invention, the user may not have programmed in a route, because he is driving in an area he is generally familiar with. As such, a warning can only be given based on the general proximity to the in-the-road, passable obstruction, the speed of travel, and the lane of travel.

In other embodiments of the invention, servers could be distributed and only handle a certain area. Alternatively, the memory capacity of in-the-road, passable obstruction warning unit 100 may be limited, at least in the amount of storage capacity that is dedicated to storage of in-the-road, passable obstruction information. Therefore, it may be desirable that in-the-road, passable obstruction information be downloaded at various times. For example, in one embodiment of the invention, in-the-road, passable obstruction information is downloaded from a new server to in-the-road, passable obstruction warning unit 100 when it is determined that in-the-road, passable obstruction warning unit 100 is transiting from the area served by the server from which it previously downloaded in-the-road, passable obstruction information to an area served by another server. Similarly, in-the-road, passable obstruction information may be downloaded when it is determined that in-the-road, passable obstruction warning unit 100 is moving beyond an inner defined area, e.g., defined by an inner radius from an initial location. In such a situation, the new area is defined by the location at which the downloading occurs, which also defines the location from which the new inner radius is measured.

Figure 5:
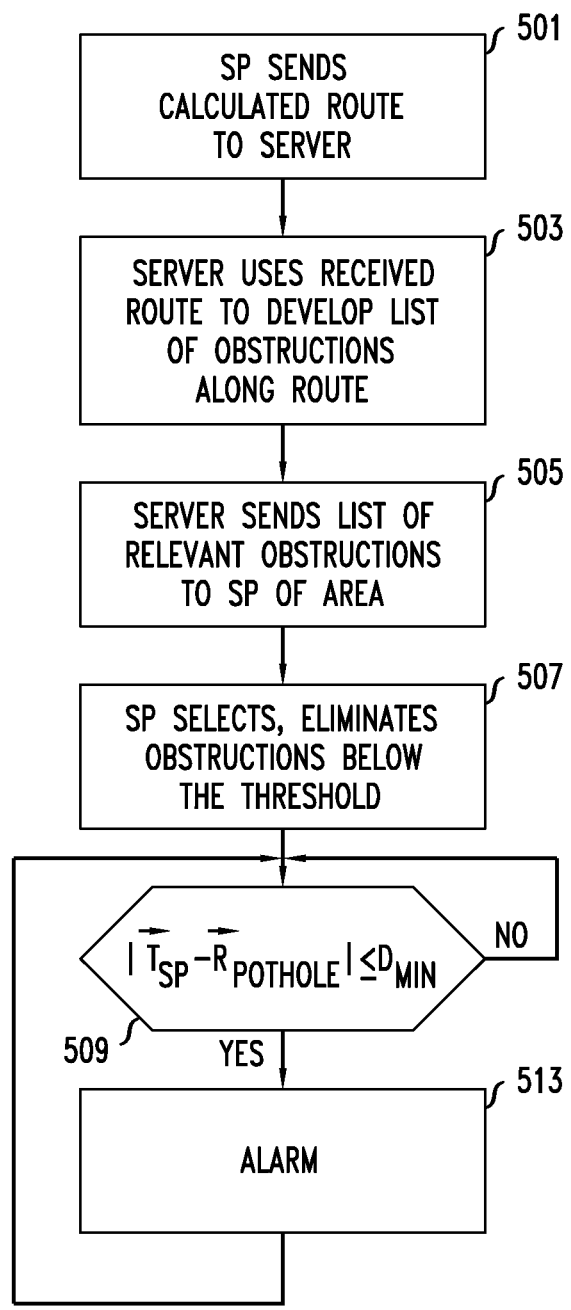
FIG. 5 shows an exemplary process for giving a warning about an in-the-road, passable obstruction.

The foregoing may be achieved, for example, by the process in FIG. 5. The process is entered in step 501 in which in-the-road, passable obstruction warning unit 100 sends to the server the route it has calculated to reach the destination. In step 503, server 300 uses the received route to develop at least a list of in-the-road, passable obstructions that are along the route, and it may also add to the list in-the-road, passable obstructions that are within a wider corridor, e.g., within a radius of 3 miles on each side of the route. Note, as will be further described hereinbelow, some of the in-the-road, passable obstructions may be intentionally omitted from the list in order to aid in determining as to whether a detected in-the-road, passable obstruction continues to exist. In the event an in-the-road, passable obstruction is omitted from the list, server 300 notes which in-the-road, passable obstructions, if any, have been omitted, and for which user. Optionally, the list may include an indication of the size of each in-the-road, passable obstruction, which may simply be, for example, a) a simplified size indication such as small, medium, or large, or b) an indication of the stored magnitude of the accelerometer reading for the in-the-road, passable obstruction.

In step 505, server 300 sends the developed list of in-the-road, passable obstructions to in-the-road, passable obstruction warning unit 100. Thereafter, in optional step 507, in-the-road, passable obstruction warning unit 100 eliminates in-the-road, passable obstructions which have a size below a predetermined threshold, which is typically selected by the user. For example, the user may only want to be alerted to medium and large in-the-road, passable obstructions and to not be bothered by warnings for small in-the-road, passable obstructions.

Next, conditional branch point 509 tests to determine if the vehicle is approaching an in-the-road, passable obstruction. This may be achieved by determining the distance from the vehicle's current location to each of the in-the-road, passable obstructions remaining on the in-the-road, passable obstruction list after step 507, where the distance is preferably calculated along the road from the current location to the in-the-road, passable obstruction and comparing each distance with a threshold where those in-the-road, passable obstructions having a distance less than the threshold are considered to be approached. The distance may be based on the GPS coordinates of the location of the vehicle and the GPS coordinates of the location of the in-the-road, passable obstruction and the distance between them along the currently calculated route. The threshold may be dependent on the current speed of the vehicle, so that the threshold is higher at higher speeds. This may be achieved by multiplying a base threshold by a factor and by the current speed.

If the test result in step 509 is NO, indicating that the distance to each of the in-the-road, passable obstructions is greater than the comparison threshold, control passes back to step 509, to continue testing as the vehicle proceeds to be driven, and so changes its position. If the test result in step 509 is YES, indicating that the distance to at least one of the in-the-road, passable obstructions is less than the comparison threshold, control passes to step 513, in which an alarm is proved to the driver by in-the-road, passable obstruction warning unit 100. The warning may be provided only for a subset of in-the-road, passable obstruction for which the distance to the in-the-road, passable obstruction is less than the comparison threshold, e.g., only for the in-the-road, passable obstruction having the shortest distance.

For example, a warning may be "pothole in 100 feet", which may be provided via audio output unit 109 of in-the-road, passable obstruction warning unit 100. The warning may also be visually displayed on display 111 of in-the-road, passable obstruction warning unit 100. Optionally, the warning may contain additional information about the in-the-road, passable obstruction. For example, it may indicated where the in-the-road, passable obstruction is located, such as "pothole on the left in 100 feet". The warning may also provide an instruction as to how to avoid the in-the-road, passable obstruction, such as "Pothole on the left in 100 feet. It is recommended to change to the right lane".

Additional information may also be provided, such as an advertisement. One such advertisement might be, for example, "This pothole avoidance warning was brought to you by Alcatel-Lucent." Alternatively, it may be better to determine if the in-the-road, passable obstruction was successfully avoided and then to provide such an advertisement. This may be achieved by monitoring the accelerometer readings of in-the-road, passable obstruction warning unit 100 and as the vehicle passes within the location at which the accelerometer would detect the in-the-road, passable obstruction if the vehicle did not avoid it and if the in-the-road, passable obstruction is not detected to provide the advertisement. Or, it may be that a lane change is detected, based on the GPS coordinates of the vehicle, and so the vehicle makes its closest approach to the in-the-road, passable obstruction it is determined that the in-the-road, passable obstruction is not in the path of the vehicle.

In the even an in-the-road, passable obstruction is removed or repaired, it is desirable to remove it from the list of in-the-road, passable obstructions maintained by server 300. This may be achieved by one of at least several exemplary ways as follows.

First, a user may be presented with a message requesting input on whether an in-the-road, passable obstruction that is warned about actually was observed by the user to indeed be present or if it was not observed. Such a request could be shown on display 111 or presented audibly by audio output unit 109. A response from the user may be entered via keyboard input 115. In the event that the user indicates that the in-the-road, passable obstruction was not present, e.g., by selecting an appropriate button on keyboard input 115, a message is sent back to server 300 indicating that the in-the-road, passable obstruction no longer appears to be present. Server 300 then removes the indicated in-the-road, passable obstruction from its list of in-the-road, passable obstructions. Note that rather than simply remove the indicated in-the-road, passable obstruction immediately, to obtain better accuracy, server 300 might wait until it receives a specified number of indications that the in-the-road, passable obstruction has been removed, to avoid removing the in-the-road, passable obstruction prematurely in case the first user merely did not see the in-the-road, passable obstruction or perhaps accidentally hit the wrong button.

Second, a repair crew may transmit a message to server 300 indicating that a particular in-the-road, passable obstruction has been repaired or removed. In response to such a message, server 300 may then remove the indicated in-the-road, passable obstruction from its list of in-the-road, passable obstructions. Note that a message from a repair crew may be formatted such that it is distinguishable by server 300 from a message from a user. Since a message from a repair crew is more likely to be accurate than a single message from a user, it is reasonable for server 300 to remove the indicated in-the-road, passable obstruction from its list of in-the-road, passable obstructions even though there is only a single message from the repair crew.

Lastly, the removal of the in-the-road, passable obstruction may be detected by server 300 in the following manner. As mentioned hereinabove, in step in step 503, server 300 may omit one or more in-the-road, passable obstructions from the list of in-the-road, passable obstructions that it prepares for a user. For example, a particular in-the-road, passable obstruction on a busy highway for which it is desired to determine if the in-the-road, passable obstruction still exists may be omitted from the list for one percent of those users whose routes would otherwise necessitate placing that in-the-road, passable obstruction on their in-the-road, passable obstruction list. The particular users who do not receive the in-the-road, passable obstruction on their lists are maintained in a list in server 300. Operationally, it is assumed that if the in-the-road, passable obstruction still exists then those users who receive the warning about the in-the-road, passable obstruction will avoid it, notwithstanding the fact that it is possible that they will hit it in spite of having been warned, and thus may generate a report that is sent to server 300 about the existence of the in-the-road, passable obstruction. So, practically, there should not be any reports, or at least only a relatively few, for that in-the-road, passable obstruction which are generated by warned users. It is further assumed that if the in-the-road, passable obstruction has been physically cleared at the location, e.g., by repair or removal, then there will be no reports of an in-the-road, passable obstruction existing at that location from users for whom the in-the-road, passable obstruction has been omitted from their list, because there is nothing to report.

However, in the event that the in-the-road, passable obstruction has not been physically cleared at the location, some of those users who are not receiving a warning about the in-the-road, passable obstruction are likely to encounter it should the in-the-road, passable obstruction still exist on the road. Such users, when encountering the in-the-road, passable obstruction, would consequently cause an in-the-road, passable obstruction report to be sent. Therefore, in the event that no reports of an in-the-road, passable obstruction existing at that location arrive from any user within a set time period, it may be assumed that there the in-the-road, passable obstruction no longer exists and the in-the-road, passable obstruction may be removed from the list of obstructions. However, if, within the time period, reports of an in-the-road, passable obstruction existing at that location arrive from any user, the in-the-road, passable obstruction is noted to continue to exist and all users whose route would cause that in-the-road, passable obstruction to be on the list of in-the-road, passable obstructions supplied to them are supplied with the in-the-road, passable obstruction until such time as it is desired to again test to see if the in-the-road, passable obstruction still exists.

The percent of users who do not receive the warning may be a function of the expected traffic in on the road on which the in-the-road, passable obstruction is located. A typical time period for determining if the in-the-road, passable obstruction still exists may be about half a day that includes a rush hour in the direction of travel that would make encountering the in-the-road, passable obstruction more likely. However the time period may be adjusted depending on the expected traffic on the road. A month would seem to be a reasonable time to retest whether an in-the-road, passable obstruction exists. However, the retest time may be varied on a per-in-the-road, passable obstruction basis depending on factors such as the seasons, the general alacrity of road crews in that area, and the size of the in-the-road, passable obstruction, given a propensity to deal with larger in-the-road, passable obstructions more rapidly than with smaller ones.

In accordance with an aspect of the invention, instead of or in addition to a warning for a driver, the suspension of the vehicle, e.g., in a vehicle with active suspension, may be modified, e.g., softened, to provide for a better ride. In accordance with another aspect of the invention, if the vehicle is being driven on cruise control, the vehicle may be automatically slowed to reduce the effect of an impact or to give the driver more time to avoid the in-the-road, passable obstruction. If the vehicle is being driven by a form of automatic pilot, the information may be given to the automatic pilot to avoid the in-the-road, passable obstruction.

For example, as previously mentioned, vehicle control unit 119 may control the vehicle so as to 1) aid in in-the-road, passable obstruction avoidance, 2) to provide for in-the-road, passable obstruction avoidance automatically, or 3) otherwise minimize the effect on the vehicle and/or driver. For example, the suspension of the vehicle, typically with active suspension, may be modified, e.g., softened, to provide for a better ride. Preferably, the suspension is softened at a short time before the in-the-road, passable obstacle is expected to be encountered and it is kept softened until a short time after the encounter with the in-the-road, passable obstacle is concluded. Thus, if there is a sequence of obstacles within a short distance, the suspension could be kept soft for the entire stretch of road on which the obstacles are located.

If the vehicle is being driven on cruise control, the vehicle may be automatically slowed to reduce the effect of an impact or to give the driver more time to avoid the in-the-road, passable obstruction. Preferably, the speed is reduced a short time before the in-the-road, passable obstacle is expected to be encountered and it is kept reduced until a short time after the encounter with the in-the-road, passable obstacle is concluded. Thus, if there is a sequence of obstacles within a short distance, the speed could be kept reduced for the entire stretch of road on which the obstacles are located.

If the vehicle is being driven by a form of automatic pilot, the information may be given to the automatic pilot to avoid the obstruction.

What is claimed is:

1. An apparatus for use in avoiding an in-the-road, passable obstruction, comprising:
   a memory storing an indication of the existence of an in-the-road, passable obstruction;
   a database for in-the-road, passable obstructions;
   a receiver for receiving a first signal from a set of signal types consisting of audio signals and accelerometer signals indicative of the first obstruction to be added to said database;
   at least one first processor for determining if the first signal indicates the first obstruction, the at least one first processor supplying as an output a second signal indicative of the existence of said in-the-road, passable obstruction when a vehicle comes within a proximity of said in-the-road, passable obstruction prior to encountering said in-the-road, passable obstruction; and wherein the at least one first processor second signal further indicates a classification of said in-the-road, passable obstruction, the at least one first processor further supplying as an output a suggested overt action for a driver of said vehicle to take to avoid said in-the-road, passable obstruction.

2. The apparatus of claim 1, further comprising:
a receiver for receiving from a server said indication of the existence of said in-the-road, passable obstruction.

3. The apparatus of claim 1, wherein said at least one first processor generates the second signal to be perceivable by a human being.

4. The apparatus of claim 1, wherein said at least one first processor further supplies as an output an advertisement in conjunction with supplying said second signal indicative of the existence said in-the-road, passable obstruction.

5. The apparatus of claim 1, wherein said apparatus further comprises a location determiner that supplies a current location of said vehicle to said at least one first processor.

6. The apparatus of claim 1, further comprising:
a human input unit adapted to receive input from a human being indicating that said in-the-road, passable obstruction was not present.

7. The apparatus of claim 1, wherein said memory further stores the location of said in-the-road, passable obstruction.

8. The apparatus of claim 1, wherein said apparatus comprises memory, coupled to said at least one first processor, that stores map information for use by said at least one first processor.

9. The apparatus of claim 1, wherein said second signal generated by said at least one first processor is supplied to an automated control device of said vehicle that is configured to adjust the travel of said vehicle.

10. An in-the-road, passable obstruction server, comprising:
a database for in-the-road, passable obstructions; and
a transmitter for transmitting at least a subset of said in-the-road, passable obstructions toward a user equipment of the in-the-road, passable obstruction warning system,
wherein an at least one first processor further supplies as an output a signal indicating a classification of a first obstruction of the subset of an in-the-road, passable obstructions, the at least one first processor further supplying as an output a suggested overt action for a driver of said vehicle to take to avoid said in-the-road, passable obstruction;
a receiver for receiving signals from a set of signals consisting of at least one of audio signals and accelerometer signals indicative of the first obstruction to be added to said database; and
a processor for determining if said signals indeed indicate the first obstruction.

11. The in-the-road, passable obstruction server of claim 10, wherein said in-the-road, passable obstruction server further comprises:
a receiver for receiving an indication of the first obstruction of the subset of the in-the-road passable obstructions to be added to said database.

12. The server of claim 10, wherein said in-the-road, passable obstruction server further comprises a receiver for receiving a request to transmit at least said subset of said in-the-road passable obstructions, and wherein said transmitter is responsive to said received request to transmit said subset.

13. The server of claim 10, wherein said subset of said in-the-road, passable obstructions is determined based upon one of a group consisting of a current location of a user equipment of the in-the-road, passable obstruction warning system, a current location of said user equipment in-the-road, passable obstruction warning system and a prescribed radius, and locations along an anticipated route of travel of said a current location of said user equipment in-the-road, passable obstruction warning system.

14. The apparatus of claim 1, wherein the at least one first processor uses a threshold to determine the existence of the in-the-road, passable obstruction, the threshold being based in part on a characterization of the vehicle.

15. The apparatus of claim 14, wherein the characterization of the vehicle includes at least one of a physical characteristic of the vehicle and a speed of the vehicle, wherein the physical characteristic of the vehicle includes at least one of vehicle suspension information, vehicle weight information, vehicle size information, and vehicle tire size information.

16. The in-the-road, passable obstruction server of claim 10, wherein the set of signals consists of both the audio signals and the accelerometer signals indicative of the first obstruction to be added to the database.

17. The in-the-road, passable obstruction server of claim 13, wherein the subset of said in-the-road, passable obstructions is determined based upon the current location of the user equipment of the in-the-road, passable obstruction warning system and the prescribed radius.

18. The apparatus of claim 9, wherein the automated control device is one of a suspension system and a cruise control system that are capable of adjusting the travel of the vehicle based on the at least one first processor.

* * * * *